US008302193B1

(12) United States Patent
Gardner et al.

(10) Patent No.: US 8,302,193 B1
(45) Date of Patent: Oct. 30, 2012

(54) METHODS AND SYSTEMS FOR SCANNING FILES FOR MALWARE (75) Inventors: Patrick Gardner, Northridge, CA (US); Mark Kennedy, Redondo Beach, CA (US); Everett Lai, Alhambra, CA (US); Haik Mesropian, Glendale, CA (US)

(73) Assignee: Symantec Corporation, Mountain View, CA (US)

( * ) Notice: Subject to any disclaimer, the term of this patent is extended or adjusted under 35 U.S.C. 154(b) by 844 days.

(21) Appl. No.: 12/130,559

(22) Filed: May 30, 2008

(51) Int. Cl.
*G06F 21/00* (2006.01)
(52) U.S. Cl. ............ 726/24; 707/758; 707/769
(58) Field of Classification Search .......... 726/24; 707/758, 769
See application file for complete search history.

(56) References Cited

U.S. PATENT DOCUMENTS

| 7,802,303 | B1* | 9/2010 | Zhao et al. ............... 726/24 |
| 2002/0138760 | A1* | 9/2002 | Naitoh ............... 713/201 |
| 2003/0088680 | A1* | 5/2003 | Nachenberg et al. ....... 709/229 |
| 2004/0158741 | A1* | 8/2004 | Schneider ............... 713/201 |
| 2005/0132206 | A1* | 6/2005 | Palliyil et al. ............... 713/188 |
| 2006/0021041 | A1* | 1/2006 | Challener et al. ............... 726/24 |
| 2006/0074896 | A1* | 4/2006 | Thomas et al. ............... 707/4 |
| 2006/0143713 | A1* | 6/2006 | Challener et al. ............... 726/24 |
| 2006/0272021 | A1* | 11/2006 | Marinescu et al. ............... 726/24 |
| 2007/0240222 | A1* | 10/2007 | Tuvell et al. ............... 726/24 |
| 2009/0064329 | A1* | 3/2009 | Okumura et al. ............... 726/22 |

OTHER PUBLICATIONS

Venugopal, "An Efficient Signature Representation and Matching Method for Mobile Devices", Aug. 2006, The 2nd Annual International Wireless Internet Conference.*

* cited by examiner

*Primary Examiner* — Kambiz Zand
*Assistant Examiner* — Michael Guirguis
(74) *Attorney, Agent, or Firm* — Advantedge Law Group (57) ABSTRACT

A computer-implemented method includes identifying a file and calculating a first identifier for the file. The method may also include identifying a first malware identifier that is associated with a first malware program. The method may further include comparing the first file identifier with the first malware identifier to determine whether the file comprises the first malware program. The method may include saving the first file identifier in a manner that allows the first file identifier to be retrieved for comparison with a second malware identifier. The second malware identifier may be associated with a second malware program. Various other methods and systems are also disclosed herein.

19 Claims, 7 Drawing Sheets

METHODS AND SYSTEMS FOR SCANNING FILES FOR MALWARE

BACKGROUND

Consumers and businesses increasingly rely on computers to store sensitive data. Consequently, malicious programmers seem to continually increase their efforts to gain illegitimate control and access to others' computers. Computer programmers with malicious motivations have created and have continued to create viruses, Trojan horses, worms, and other programs meant to compromise computer systems and data belonging to other people. These malicious programs are often referred to as malware.

Security software companies are combating the growing tide of malware by creating and deploying malware signatures (e.g., hashes that identify malware) to their customers on a regular basis. For example, security software companies may send malware signature updates to their customers multiple times a day. By frequently updating malware signatures, security software companies may help their customers secure their computers against new and changing threats.

Each time a customer receives a malware definition update, the customer's computer may need to rescan numerous files to assure no malware is running on the computer. Consequently, customers' computers may take a performance hit each time they receive a malware signature update. Performance loss on customers' machines increases as the size and frequency of signature updates increases. The performance loss may result in a negative customer experience.

SUMMARY

Various embodiments disclosed herein may enable malware scans that are more efficient than previous scans. For example, as part of a first malware scan of a computing device, a security module may identify a file on the computing device and calculate a first file identifier for the file. The first file identifier may be a hash of the file. The security module may then identify a first malware definition that is associated with a first malware program. The security module may compare the first file identifier to the first malware definition to determine whether the file comprises the first malware program.

In some embodiments, the security module may save the first file identifier in a manner that may allow the first file identifier to be retrieved for use in a second malware scan. The computing device may receive a malware definition update, which may trigger the second malware scan of the computing device. During the second scan of the computing device, the security module may identify the file and retrieve the first file identifier. The security module may then compare the first file identifier with a second malware definition to determine whether the file comprises a second malware program associated with the second malware definition.

The security module may save the first file identifier by storing the first file identifier as metadata of the file, by storing the file identifier in a file identifier database, or by using any other suitable storage mechanism. Storing the file identifiers may allow the security module to scan files without performing resource intensive input and output operations that are typically associated with computing file identifiers. This may result in significant time savings and performance benefits for security scans.

In some embodiments, the first hash may be a hash of only a first portion of the file. Thus, a result of comparing the first hash with the first malware definition may indicate or suggest that the file comprises the first malware program, but the result may not be definitive (i.e., the result may not be dispositive of whether the file comprises the first malware program). In order to make a more definitive determination, the security module may calculate a second hash of a second portion of the file. The security module may compare the second hash with the first malware definition. If the second hash matches the first malware definition, the security module may conclude that the file comprises the first malware program. The second hash may be a hash of the remaining portion of the file (i.e., the rest of the file after the first portion). The instant disclosure also presents various other alternatives and embodiments for scanning files for malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The instant disclosure is directed to improving malware scans by storing file identifier information (e.g., hashes) of a file for later use. For example, as part of a first security scan, a security module may calculate the hash for a file. The security module may then store the hash for a subsequent security scan.

When the security module receives a malware definition update, the security module may initiate a second scan. As part of the second scan, the security module may retrieve the hash for the file and compare the hash against malware definitions from the malware definition update. This process may be faster than recalculating the hash each time a malware definition update is received. As discussed in greater detail below, the methods and systems discussed herein may provide various other features and advantages.

Figure 1:
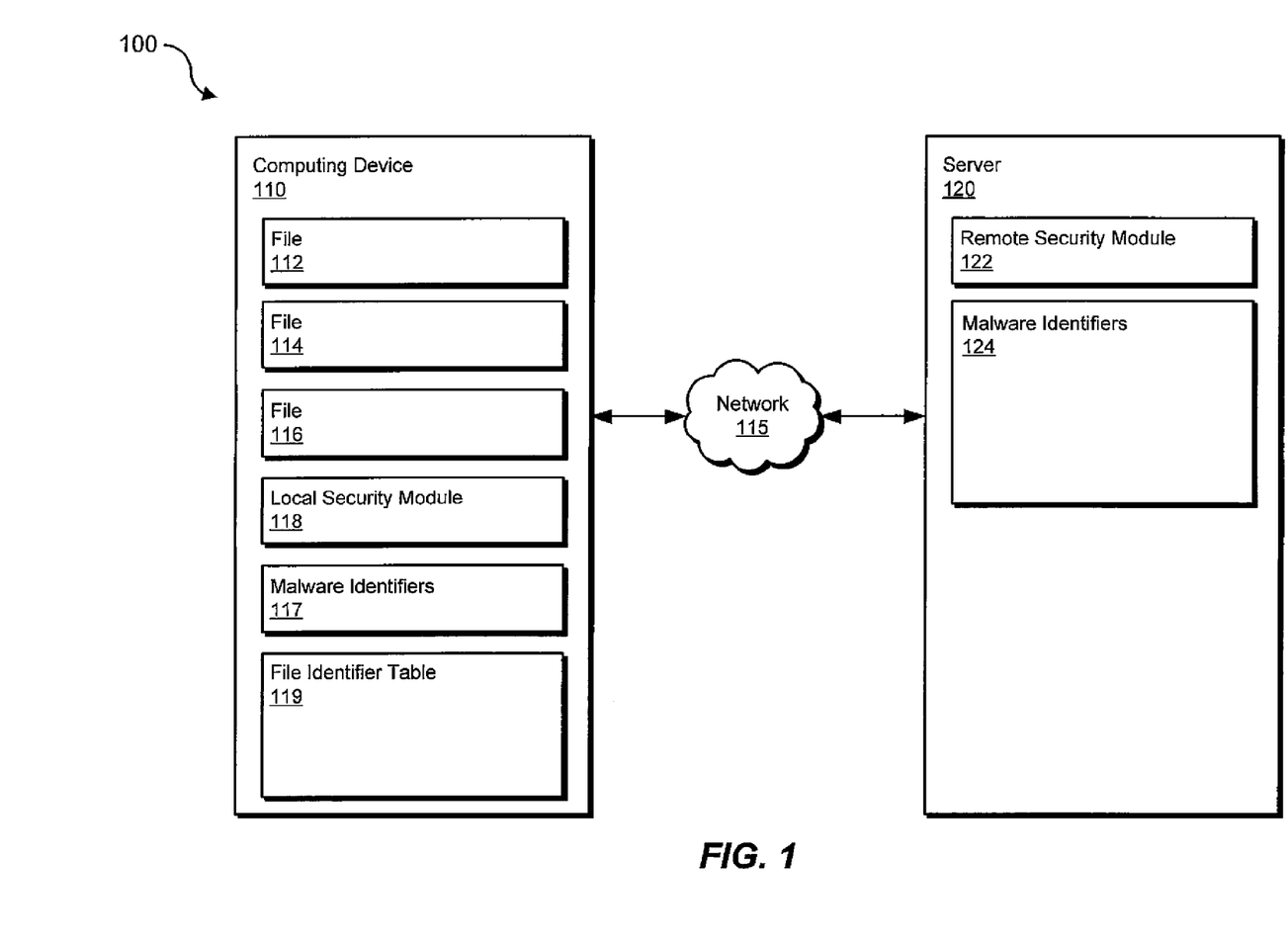
FIG. 1 is a block diagram of an exemplary network according to certain embodiments.

FIG. 1 shows an exemplary network 100 with a computing device 110 and a server 120. Computing device 110 and server 120 may communicate over network 115. Network 115 may be a local area network, a wide area network, the Internet, or any other suitable network. Server 120 may include a remote security module 122. Computing device 110 may include a local security module 118 that receives malware updates from remote security module 122. Remote security module 122 may send malware updates to local security module 118 on a regular basis. For example, remote security module 122 may send malware updates to local security module 118 on a daily, hourly, or even continuous basis.

Local security module 118 may perform an initial scan of files on computing device 110 by comparing the files with malware identifiers 117. Malware identifiers 117 may be malware identifiers that are included with a security software package installed on computing device 110. Malware identifiers 117 may also be identifiers that have been downloaded from server 120. During the scan of computing device 110, local security module 118 may identify files 112, 114, and 116. Local security module 118 may then compute identifiers (e.g., hashes) for each of files 112, 114, and 116. Local security module 118 may compare the identifiers against malware identifiers 117 to determine whether any of files 112, 114, or 116 comprises malware.

In prior solutions, identifiers for files 112, 114, and 116 may have been recomputed each time local security module 118 received a malware update. In contrast, in embodiments of the instant disclosure, local security module 118 may save the file identifiers for use in subsequent scans. In some embodiments, local security module 118 may save the file identifiers in a file identifier table, such as file identifier table 119 of computing device 110. In other embodiments, local security module 118 may save the file identifiers as metadata with the respective files they represent. Local security module 118 may also store the file identifiers in a local or remote database.

At some point after performing the first scan, local security module 118 may receive a malware update from remote security module 122. The malware update may include new malware identifiers 124. After receiving the malware update, local security module 118, may perform an additional scan of the files on computing device 110 using malware identifiers 124. For this scan, local security module 118 may retrieve files from file identifier table 119 rather than recomputing the file identifiers, which may result in substantial efficiency improvement by eliminating the input and output required to compute hashes for each file. During the scan, local security module 118 may compare the file identifiers with malware identifiers 124 to determine whether any of files 112, 114, and 116 comprise malware.

Figure 2:
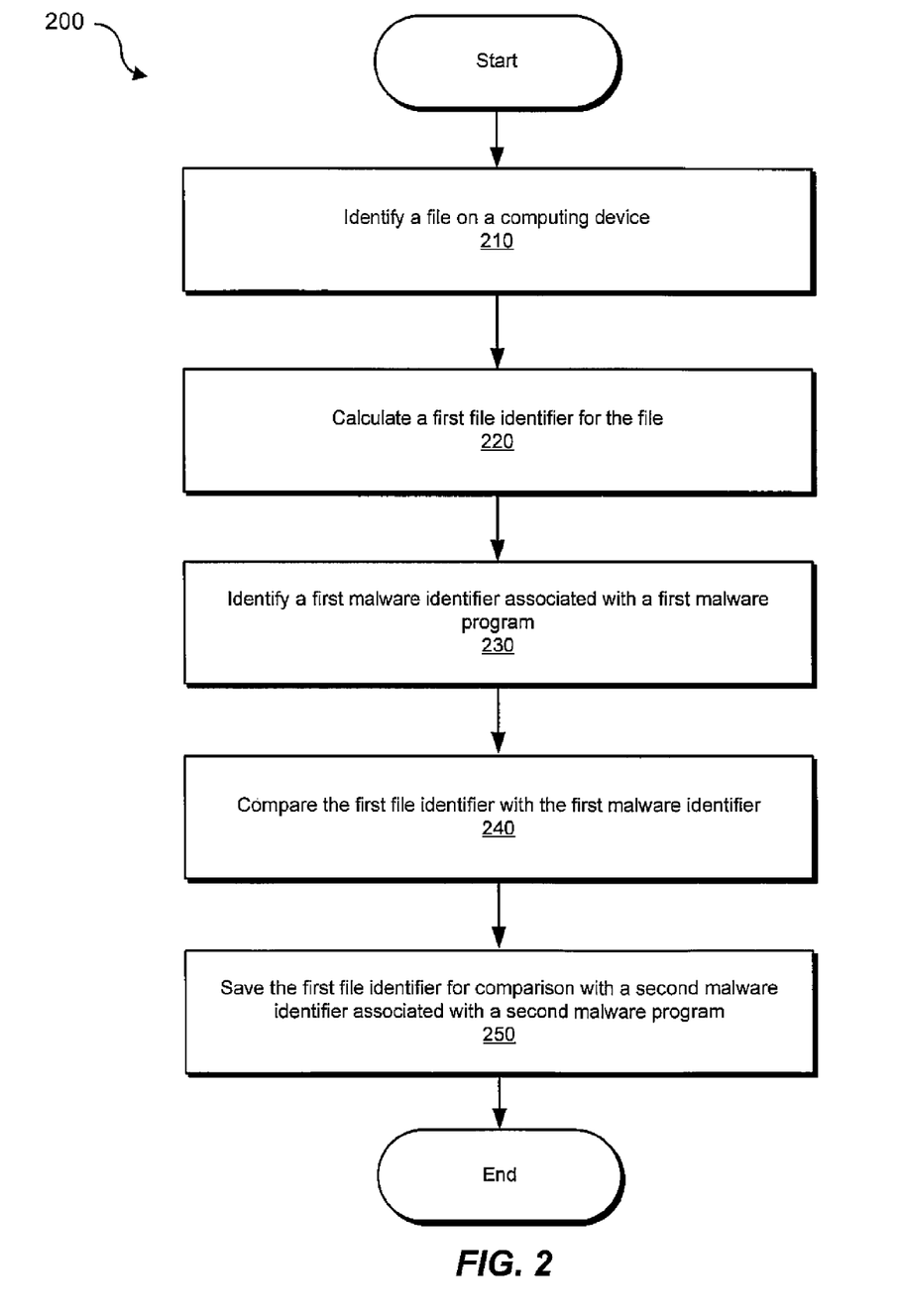
FIG. 2 is a flow diagram of an exemplary method for scanning files for malware according to certain embodiments.

FIG. 2 illustrates an exemplary method for performing the file identifier scanning and identifier saving discussed in FIG. 1. A security module, such as local security module 118, may perform a first scan of a computing device. During the first scan, the security module may identify a file (step 210). In some embodiments, the file may be an open file. The file may also be any other type of file capable of being analyzed by the security module. The file may be an executable file, a program, a data file, a module, or any other computer-readable data. In some embodiments, identifying the file may be part of a scan in which a security module is scanning all open files, a subset of open files, all or a subset of files in a particular directory, or any other set of files on a computing system.

After identifying the file, the security module may calculate a first file identifier for the file (step 220). The first file identifier may be any one-to-many representation of the file. For example, the first file identifier may be a hash. A hash may be a value, code, sum, or other data calculated using a hash function (e.g., a function that takes an input of a data stream of any length and produces an output of a value of a certain fixed size). The hash function may be a cyclic redundancy check (CRC). In other embodiments, the hash function may be a cryptographic hash function, such as a message-digest algorithm 5 (MD5) hash function. The hash function may also be a secure hash algorithm (SHA) cryptographic hash function, such as a SHA-0, SHA-1, SHA-256, or SHA-512 hash function. The first file identifier may also be computed by applying any other public or private hash algorithm to the file.

After calculating the first file identifier, the security module may identify a first malware identifier (step 230). The first malware identifier may be from a set of malware identifiers. The first malware identifier may be associated with a first malware program. In other words, the first malware identifier may be a signature or definition of the first malware program. Like the first file identifier, the first malware identifier may comprise a hash that was computed using any suitable hash function of the first malware program. The first malware program may comprise a virus, a Trojan horse, a worm, a rootkit, spyware, adware, a botnet, a keystroke logger, and/or any other programs meant to compromise computer systems and data belonging to other people.

The security module may compare the first file identifier with the first malware identifier to determine whether the file comprises the first malware program (step 240). The first file identifier may be a hash of only a portion of a file, and therefore the comparison may only indicate that the file may comprise the first malware program. The comparison may result in a definitive determination that the file does not comprise the first malware program. In other words, if the first file identifier does not match the first malware identifier, the security module may conclude that the first file does not comprise the first malware program.

Figure 4:
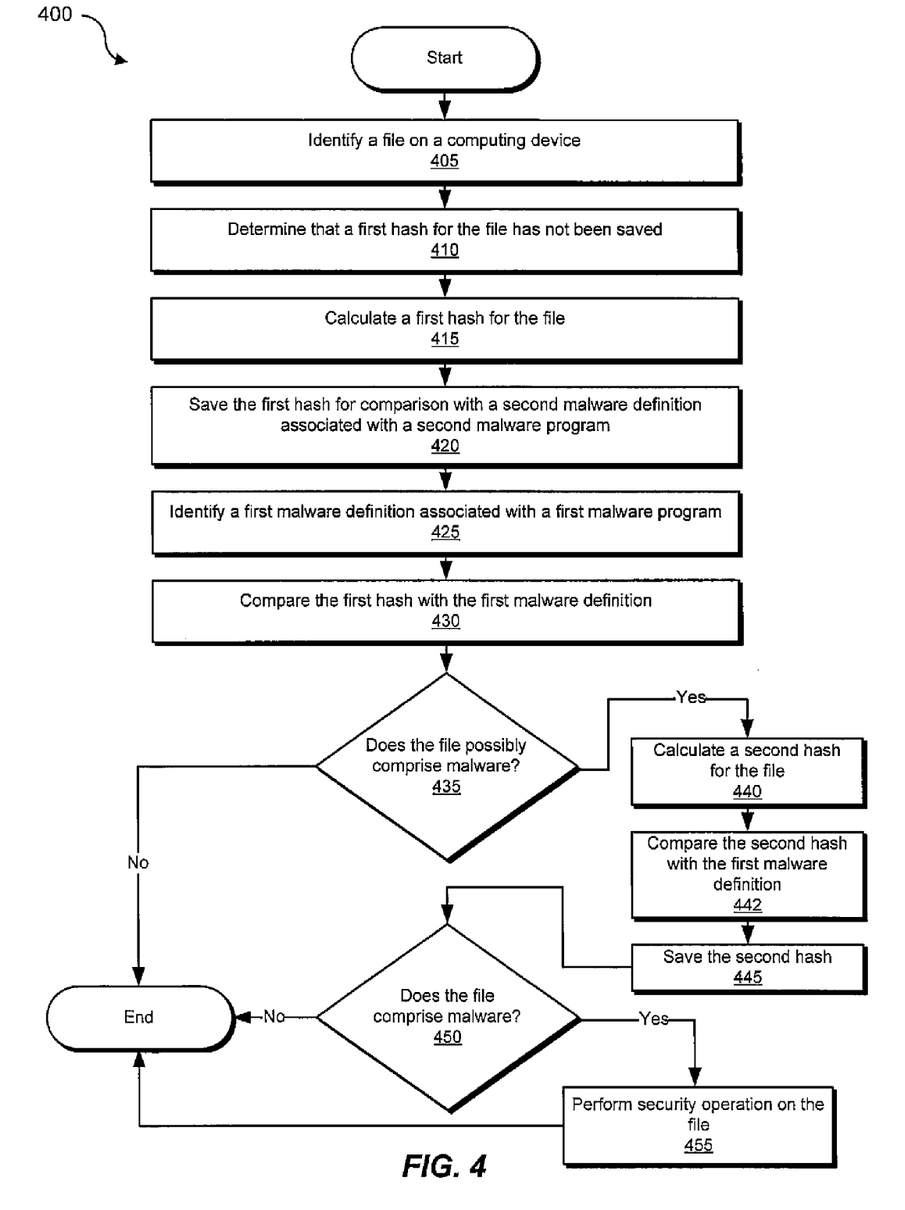
FIG. 4. is a flow diagram of an exemplary method for scanning files for malware according to certain embodiments.

If the first file identifier matches the first malware identifier, this result may indicate or suggest that the file comprises the first malware program, but the result may not be definitive (i.e., the result may not be dispositive of whether the file comprises the first malware program). In order to make a more definitive determination, the security module may calculate a second hash of a second portion of the file. The security module may compare the second hash with a first malware definition. If the second hash matches the first malware definition, the security module may conclude that the file comprises the first malware program. The second hash may be a hash of the remaining portion of the file (i.e., the rest of the file after the first portion). FIG. 4 and the corresponding discussion present various embodiments of how a security module may determine whether a file comprises malware.

A security module may compare the first file identifier with the first malware identifier by determining whether the first file identifier is identical to the first malware identifier. In other embodiments, a security module may compare the first file identifier with the first malware identifier by determining whether the first file identifier is similar to, or substantially the same as, the first malware identifier. In embodiments where the first file identifier is a hash of a first portion of a file, a security module may compare the first file identifier with a first section of the first malware identifier.

The security module may save the first file identifier in a manner that allows the first file identifier to be retrieved for use in a second scan of the computing device (step 250). The first file identifier may be saved at any point after it is calculated. For example, saving the first identifier may be performed after calculating the first identifier but before identifying the first malware identifier (e.g., immediately after calculating the first identifier), after identifying the first malware identifier but before comparing the first file identifier with the first malware identifier, after comparing the first file identifier with the first malware identifier, or at any other suitable time.

Saving the first file identifier in a manner that allows the first file identifier to be retrieved for use in a second scan may comprise saving the first file identifier as metadata of the file. In other embodiments, as previously mentioned, saving the first file identifier may comprise saving the file identifier in a file identifier table and/or database. A security module may also save the file identifier using any other suitable storage mechanism.

While FIG. 2 shows the process of identifying and comparing one file with a malware identifier and then saving a file identifier for the file, a scan typically involves comparing numerous file identifiers against numerous malware identifiers. For example, the step of identifying the file (step 210) may comprise identifying a set of files to be scanned for malware. The set of files may comprise the file. Similarly, calculating a first file identifier (step 220) may comprise calculating a set of file identifiers for the set of files. The set of file identifiers may comprise a file identifier for each file in the set of files. The set of files may be any set of files, such as all open files, suspect files, and/or all files on a computing system, in a file system, or in a directory.

Identifying the first malware identifier (step 230) may comprise identifying a first set of malware identifiers. The first malware identifier may be included in the first set of malware identifiers. Comparing the first file identifier with the first malware identifier (step 240) may comprise comparing each file identifier and the set of file identifiers with each malware identifier in the first set of malware identifiers. In some embodiments, this comparison may be performed by using a linear search. In other embodiments, the comparison may be performed by using a binary source.

A comparison of file identifiers and malware identifiers may be performed by taking each file identifier from the set of file identifiers and comparing it against each malware identifier in the set of malware identifiers to determine whether there is a match. In other embodiments, the comparison may be performed by taking a malware identifier from the first set of malware identifiers and comparing it against each file in the set of files. This embodiment may be particularly useful when the file identifiers are saved in a table of file identifiers.

In some embodiments, before using a stored file identifier, the security module may determine whether the file identifier has been modified since the file identifier was calculated. This may ensure that the identifiers are up-to-date and that a file has not been changed or modified to include malware since the identifier was computed. If the file has been modified since the first identifier was calculated, the security module may recalculate the first file identifier. If the file has not been modified since the first file identifier was calculated, there may be no need to recalculate the first file identifier.

Figure 3:
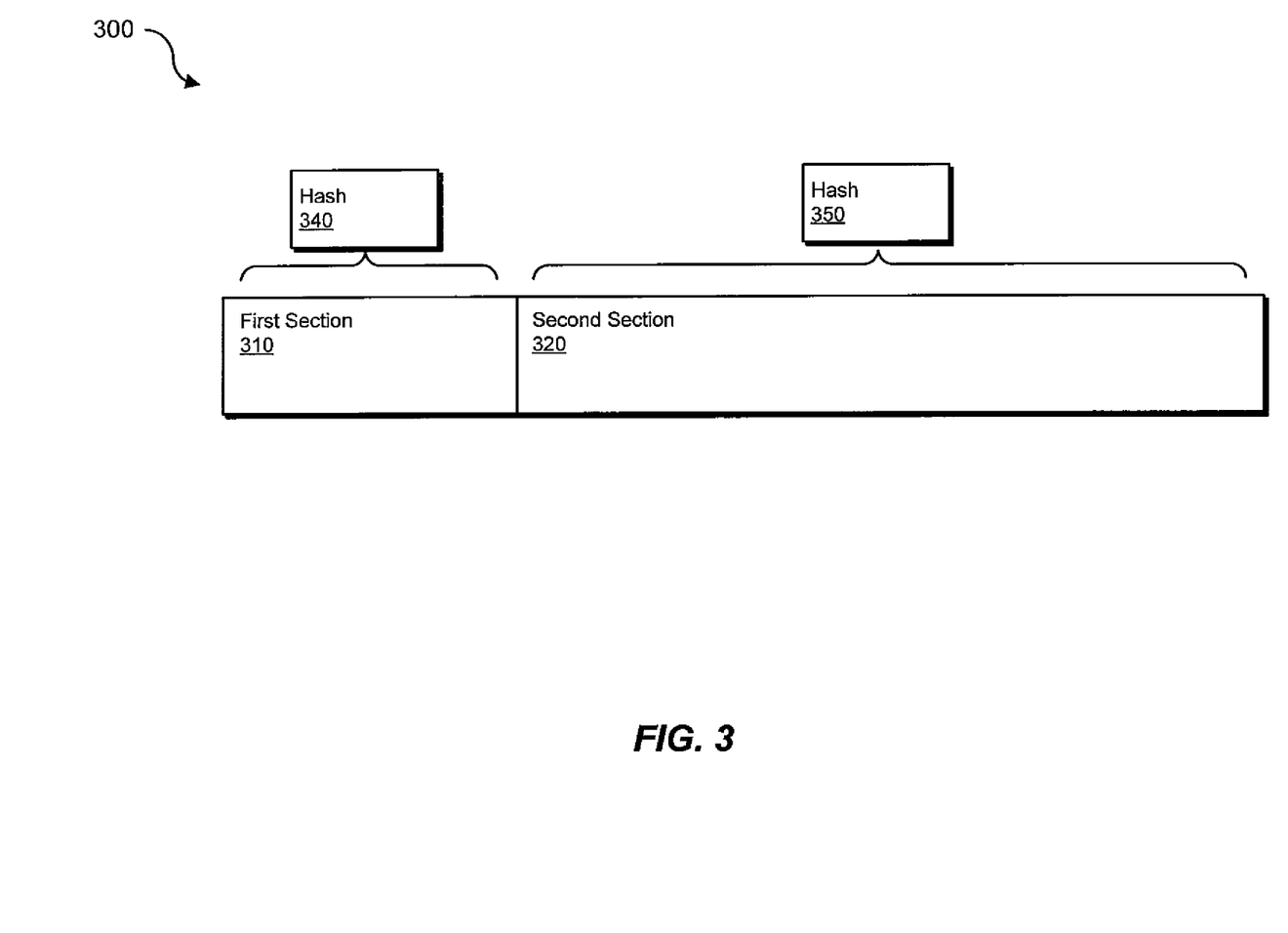
FIG. 3 is a block diagram of an exemplary file and corresponding hashes according to certain embodiments.

As previously mentioned, security modules may go through an iterative process in determining whether a file comprises malware. For example, a first hash may be a hash of only a first portion of a file. This may allow for increased speed and efficiency in an initial scan of files to determine whether they might be malware. FIG. 3 shows an exemplary file with a first section 310 and a second section 320. A security module may calculate a hash 340 for first section 310. If hash 340 matches a malware identifier, the security module may compute a second hash 350 (i.e., a second-level identifier) for second section 320 of file 300. The security module may compare hash 350 with the malware identifier to determine whether there is a complete match between the two. In other embodiments, a security module may calculate more than two hashes for more than two sections of a file. The second hash (and other additional hashes, if calculated) may be stored in the same manner that the first hash is stored.

FIG. 4 illustrates an example of using a second-level identifier to determine whether a file comprises malware. A second-level identifier may be a second hash of a file, such as hash 350 shown in FIG. 3. As shown in FIG. 4, a security module may identify a file (step 405). The security module may check to determine whether a first hash for the file has already been computed and saved. For example, the security module may check the metadata of the file and/or a hash table to determine whether a hash for the file already exists. The security module may determine that a first hash for the file has not been saved (step 410). Since a hash for the file does not already exist or has not been saved, the security module may calculate the hash for the file (step 415).

After calculating the hash, the security module may identify the first malware definition that is associated with the first malware program (step 425). The security module may then compare the first hash with the first malware definition to determine whether the file comprises the first malware program (step 430). The security module may save the first hash in a manner that allows the first hash to be retrieved for comparison with a second malware definition at a later point in time, such as during a later scan (step 420). The second malware definition may be associated with a second malware program.

The security module may query whether the file comprises malware (decision point 435). If the first hash for the file does not match the malware definition, exemplary method 400 may terminate. On the other hand, if the first hash matches the first malware definition, the security module may calculate a second hash for a second portion of the file (step 440). The second portion of the file may be any portion of the file. The second portion of the file may be a portion of the file that is subsequent to the first portion of the file. The second portion may be a portion that comprises the remainder of the file, or may only comprise another sub-portion of the file.

After calculating the second hash for the file, the security module may save the second hash (step 445). In other embodiments, the security module may save the second hash at any other suitable time. The security module may save the second hash in the same manner that the first hash is saved. In other words, the second hash may be stored as metadata with the file, in a table of file identifiers, and/or in any other suitable manner. If the second hash does not represent the remainder of the file, subsequent hashes may be calculated and stored in the same manner that the first and second hashes are calculated and stored.

The security module may compare the second hash with the first malware definition (step 442). In some embodiments, the security module may compare the second hash with a second portion of the malware definition. This comparison may determine whether the file comprises malware (decision point 450). If the second hash does not match the malware definition, the security module may determine that the file does not comprise malware and the process may end. On the other hand, if the security module determines that the second hash matches the malware identifier, the security module may perform a security operation on the file (step 455). The security operation may be any suitable security operation. For example, the security module may quarantine the file, delete the file, provide a warning to a user of a computing device that the file may comprise malware, report the malware to security software, and/or perform any other security function with respect to the file.

After the process shown in FIG. 4 terminates, the security module may receive a second malware definition. The security module may initiate a second scan, and as part of the second scan, the security module may determine whether the file has been modified since the first and second hashes were calculated. The security module may recalculate the first hash if the file has been modified since the first hash was calculated. The security module may also recalculate the second hash if the file has been modified since the second hash was calculated. Then, the security module may use the first and/or second hashes to determine whether the file comprises the second malware program.

Figure 5:
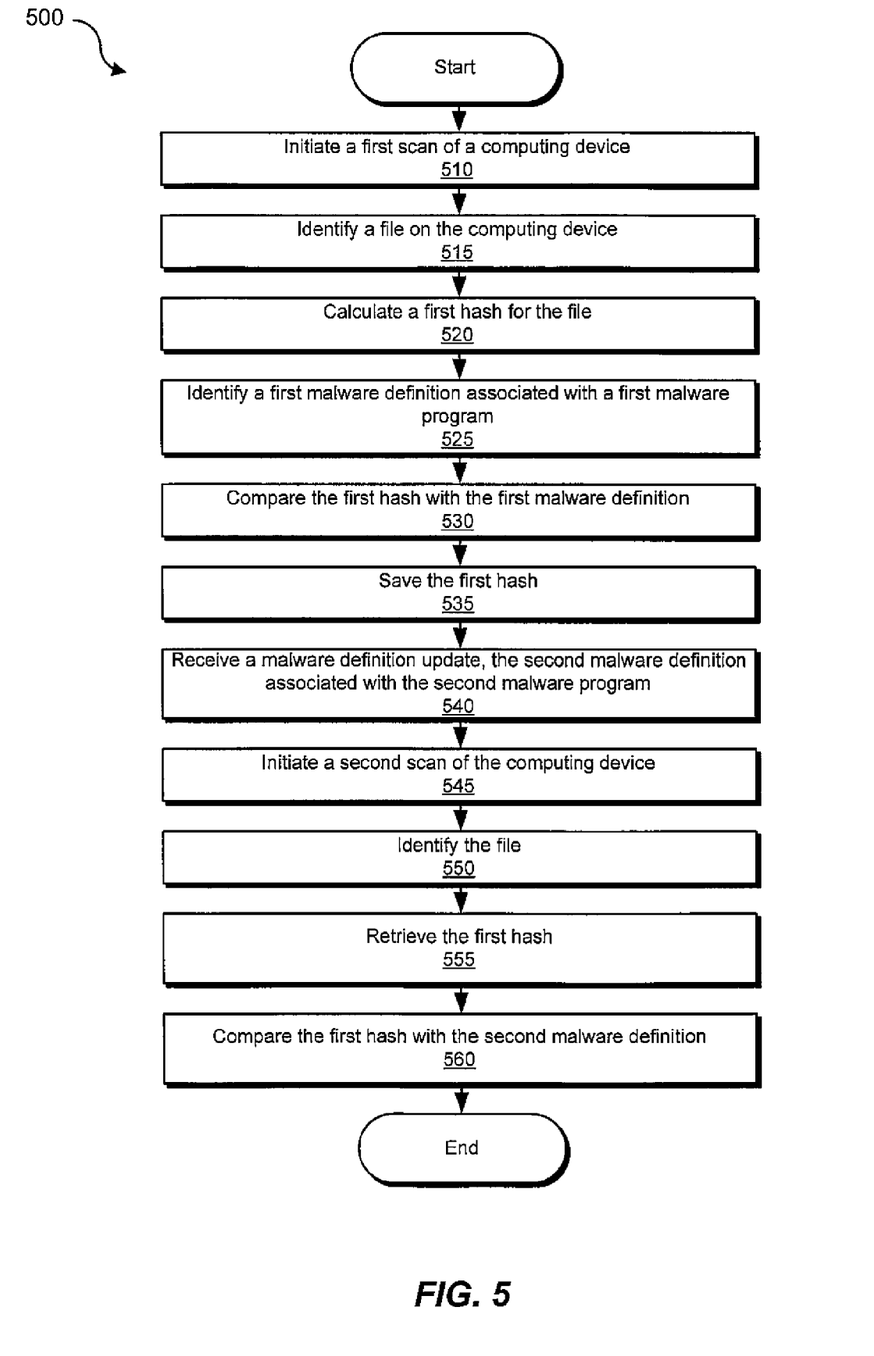
FIG. 5 is a flow diagram of another exemplary method for scanning files for malware according to certain embodiments.

FIG. 5 shows another exemplary method for determining and detecting malware in files. A security module may initiate a first scan of the computing device (step 510). The first scan may comprise identifying a file (step 515), calculating a first hash for the file (step 520), and identifying a first malware definition (step 525). The first malware definition may be associated with a first malware program. The first scan may also comprise comparing the first hash with the first malware definition to determine whether the file comprises the first malware program (step 530). The security module may then save the first hash (step 535).

The security module may receive a malware definition update (step 540). The malware definition update may comprise the second malware definition. The second malware definition may be associated with a second malware program. The security module may initiate a second scan of the computing device after receiving the malware definition update (step 545). As part of the second scan, the security module may identify the file (step 550) and retrieve the first hash (step 555). After retrieving the first hash, the security module may compare the first hash with the second malware definition to determine whether the file comprises the second malware program (step 560).

Figure 6:
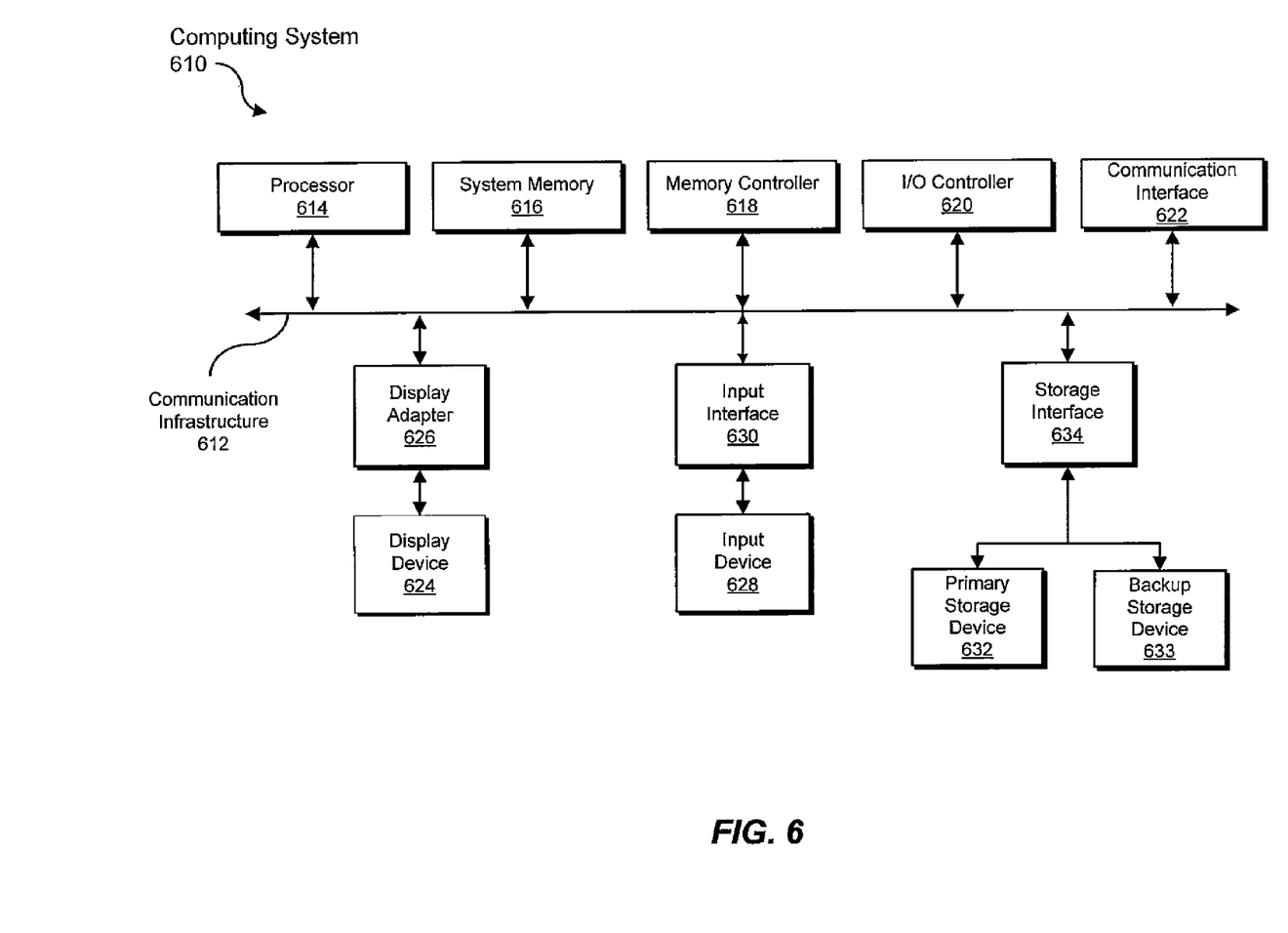
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the determining, comparing, calculating, recalculating, identifying, saving, performing, searching, receiving, and/or retrieving steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as determining, comparing, calculating, recalculating, identifying, saving, performing, searching, receiving, and/or retrieving.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the determining, comparing, calculating, recalculating, identifying, saving, performing, searching, receiving, and/or retrieving steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and DATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the determining, comparing, calculating, recalculating, identifying, saving, performing, searching, receiving, and/or retrieving steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the determining, comparing, calculating, recalculating, identifying, saving, performing, searching, receiving, and/or retrieving steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the determining, comparing, calculating, recalculating, identifying, saving, performing, searching, receiving, and/or retrieving steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
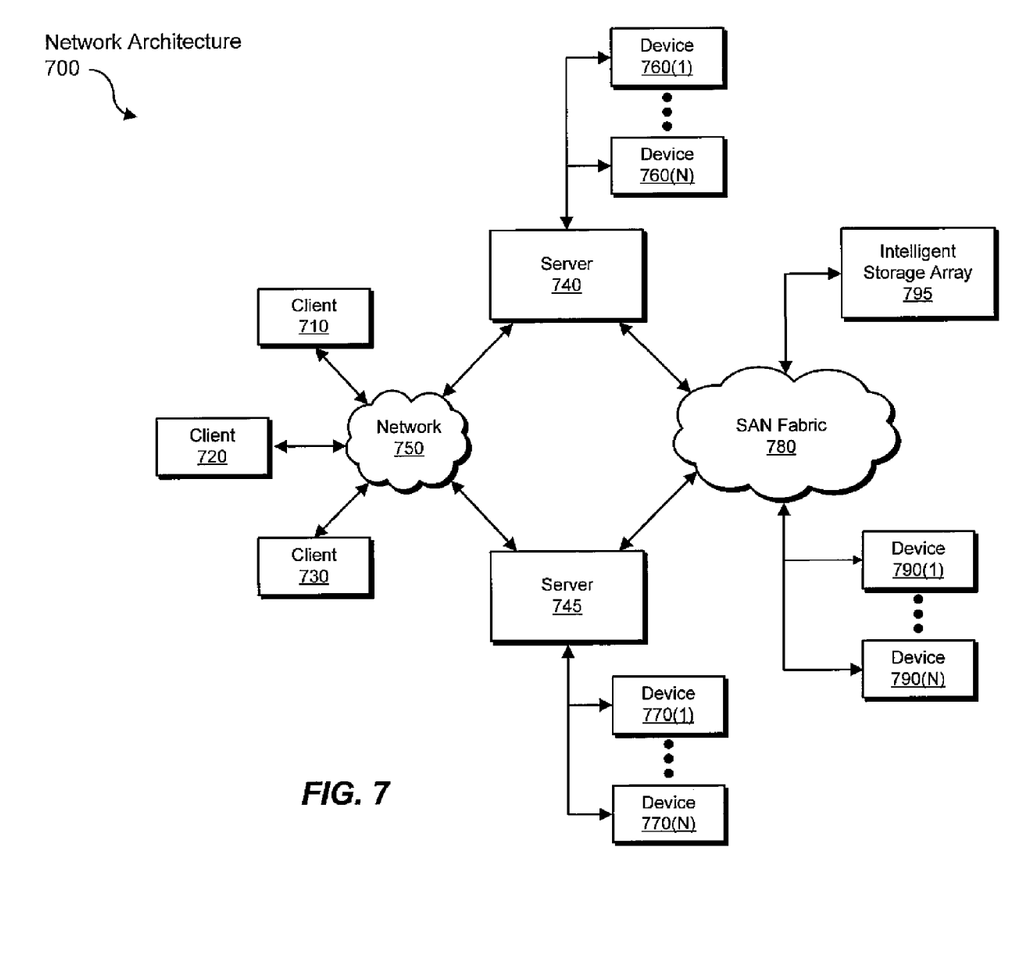
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the determining, comparing, calculating, recalculating, identifying, saving, performing, searching, receiving, and/or retrieving steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, a computer-implemented method for scanning files for malware may comprise performing a first scan of a computing device. The first scan may comprise identifying a file on the computing device, calculating a first file identifier for the file, and identifying a first malware identifier. The first malware identifier may be associated with a first malware program.

The method may further comprise comparing the first file identifier with the first malware identifier to determine whether the file comprises the first malware program. The method may also comprise saving the first file identifier in a manner that allows the first file identifier to be retrieved for comparison with a second malware identifier. The second malware identifier may be associated with a second malware program.

In some embodiments, identifying the file may comprise identifying a set of files to be scanned for malware. Calculating the first file identifier may comprise calculating a set of file identifiers for the set of files. The set of file identifiers may comprise a file identifier for each file in the set of files. In some embodiments, identifying the first malware identifier may comprise identifying a first set of malware identifiers. Similarly, comparing the file identifier with the first malware identifier may comprise comparing each file identifier in the set of file identifiers with each malware identifier in the first set of malware identifiers. Saving the file identifier may comprise saving each file identifier in the set of file identifiers in a manner that allows each file identifier to be retrieved for use in a second scan of the computing device.

In at least one embodiment, the second scan of the computing device may comprise receiving a second set of malware identifiers. Receiving a second set of malware identifiers may further comprise retrieving each file identifier in the set of malware identifiers. The second scan may also comprise comparing each file identifier from the set of file identifiers with each malware identifier in the second set of malware identifiers.

In other embodiments, the method may comprise saving each file identifier in the set of file identifiers by saving each file identifier in a table of file identifiers. Other embodiments may comprise saving each file identifier in the set of file identifiers in a file identifier database.

In some embodiments, calculating the first file identifier may comprise calculating a hash of the first file identifier. In at least one embodiment, the first malware identifier may comprise a hash of a virus. According to various embodiments, saving the first file identifier may comprise saving the first file identifier with the file as metadata of the file.

According to various embodiments, the method may comprise the second scan of the computing device. The second scan may comprise receiving the second malware identifier in determining whether the file has been modified since the file identifier was calculated. The method may also comprise recalculating the first file identifier, if the file has been modified since the first file identifier was calculated. The method may further comprise comparing the first identifier with the second malware identifier, after determining whether the file needed to be recalculated.

In some embodiments, a result of comparing the first file identifier with the first malware identifier may suggest that the file comprises the first malware program. In other words, the result of comparing the first file identifier with the first malware identifier may indicate that the first file possibly comprises malware, but may not provide a definite result. In such embodiments, the method may comprise calculating a second file identifier for the file and determining whether the file comprises the malware by comparing the second file identifier with the first malware identifier.

In some embodiments, a computer-implemented method for scanning files for malware may comprise performing a first scan of a computing device. The first scan may comprise identifying a file on the computing device and determining that a first hash for the file has not been saved. A method may also comprise calculating a first hash for the file and identifying a first malware definition. The first malware definition may be associated with the first malware program. The method may further comprise comparing the first hash with the first malware definition to determine whether the file comprises the first malware program. The method may comprise saving the first hash in a manner that allows the first hash to be retrieved for use in a second scan of the computing device.

In at least one embodiment, saving the first hash may comprise saving the first hash with the metadata of the file. In some embodiments, the first hash may comprise at least one of a cyclic redundancy check hash function, a message-digest-algorithm hash function, or a secure hash algorithm hash function. In some embodiments, the method may further comprise receiving the second malware definition, determining whether the file has been modified since the first hash was calculated, and recalculating the first hash, if the file has been modified since the first hash was calculated. The method may also comprise comparing the first hash with the second malware definition.

In some embodiments, saving the first hash may comprise saving the first hash in a hash table. Comparing the first hash with the second malware definition may comprise searching the hash table for the second malware definition.

In at least one embodiment, comparing the first hash with the second malware definition may comprise searching a malware definition update for the first hash. A malware definition update may comprise the second malware definition.

In at least one embodiment, the method may further comprise determining that the file possibly comprises the first malware program by comparing the first hash with the first malware definition. The method may also comprise calculating a second hash for the file and determining that the file comprises the first malware program by comparing the second hash with the first malware definition. In some embodiments, the first hash may be a hash of a first portion of the file and a result of comparing the first hash with the first malware definition may suggest that the file comprises the first malware program. The method may further comprise calculating a second hash of a second portion of the file and determining that the file comprises the first malware program by comparing the second hash to the first malware definition.

In certain embodiments, a computer-implemented method for scanning a computing device for malware may comprise performing a first scan of the computing device. The first scan may comprise identifying a file on the computing device, calculating a first hash for the file, and identifying a first malware definition. The first malware definition may be associated with the first malware program. The first scan may also comprise comparing the first hash with the first malware definition to determine whether the file comprises the first malware program and saving the first hash. The first malware definition may comprise multiple hashes that correspond to the first and second hashes of the file.

The method may further comprise receiving a malware definition update. The malware definition update may comprise a second malware definition. The second malware definition may be associated with a second malware program. The method may further comprise performing a scan of the computing device. The second scan may comprise identifying the file and retrieving the first hash. The second scan may further comprise comparing the first hash with the second malware definition to determine whether the file comprises the second malware program.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for scanning files for malware, at least a portion of the method being performed by a computing device comprising at least one processor, the computer-implemented method comprising:
performing a first scan of the computing device, the first scan comprising:
identifying a set of files to be scanned for malware;
for each file in the set of files:
calculating a first file identifier that represents a first portion of the file;
saving the first file identifier in a manner that allows the first file identifier to be retrieved for use in a second scan of the computing device;
identifying a first malware identifier, the first malware identifier being associated with a first malware program;
comparing the first file identifier with the first malware identifier;
when a result of comparing the first file identifier with the first malware identifier suggests that the file comprises the first malware program, calculating a second file identifier that represents a second portion of the file, saving the second file identifier in a manner that allows the second file identifier to be retrieved for use in the second scan, and comparing the second file identifier with the first malware identifier to make a more definitive determination of whether the file comprises the first malware program, wherein the first and second file identifiers are calculated from different, non-overlapping portions of the file;
when a result of comparing the first file identifier with the first malware identifier indicates that the file does not comprise the first malware program, making a determination that the file does not comprise the first malware program instead of calculating the second file identifier.

2. The computer-implemented method of claim 1, wherein:
identifying the first malware identifier comprises identifying a first set of malware identifiers associated with a first set of malware programs;
for each file in the set of files, comparing the first file identifier with the first malware identifier comprises comparing the first file identifier with each malware identifier in the first set of malware identifiers;
for each file in the set of files, comparing the second file identifier with the first malware identifier comprises comparing the second file identifier with each malware identifier in the first set of malware identifiers.

3. The computer-implemented method of claim 2, further comprising:
performing the second scan of the computing device, the second scan comprising:
receiving a second set of malware identifiers;
for each file in the set of files, retrieving the first file identifier and comparing the first file identifier with each malware identifier in the second set of malware identifiers.

4. The computer-implemented method of claim 1, wherein:
for each file in the set of files, saving the first and second file identifiers comprises at least one of:
saving the first and second file identifiers in a table of file identifiers;
saving the first and second file identifiers in a file identifier database.

5. The computer-implemented method of claim 1, wherein:
for each file in the set of files, calculating the second file identifier that represents the second portion of the file comprises calculating a second file identifier that represents a subsequent and adjacent portion of the file.

6. The computer-implemented method of claim 1, wherein:
for each file in the set of files, saving the first and second file identifiers comprises saving the first and second file identifiers with the file as metadata of the file.

7. The computer-implemented method of claim 1, further comprising:
performing the second scan of the computing device, the second scan comprising:
receiving a second malware identifier, the second malware identifier being associated with a second malware program;
for each file in the set of files, determining whether the file has been modified since the first and second file identifiers were calculated;
for each file in the set of files, if the file has been modified since the first and second file identifiers were calculated, recalculating the first file identifier;
for each file in the set of files, comparing the first file identifier with the second malware identifier.

8. The computer-implemented method of claim 1, wherein:
for each file in the set of files in which comparing the first file identifier with the first malware identifier suggests that the file comprises the first malware program, calculating the second file identifier that represents the second portion of the file comprises calculating the second file identifier that represents a remainder of the file after the first portion of the file.

9. The computer-implemented method of claim 8, wherein:
for each file in the set of files in which comparing the first file identifier with the first malware identifier suggests that the file comprises the first malware program, determining whether the file comprises the first malware program comprises determining, upon comparing the first and second file identifiers with the first malware identifier, that the first and second file identifiers exactly match corresponding portions of the first malware identifier.

10. A computer-implemented method for scanning files for malware, at least a portion of the method being performed by a computing device comprising at least one processor, the computer-implemented method comprising:
performing a first scan of the computing device, the first scan comprising:
identifying a set of files to be scanned for malware;
determining that a first file identifier for a file in the set of files has not been saved to a file identifier table;
in response to the determination that the first file identifier for the file has not been saved:
calculating the first file identifier that represents a first portion of the file;
saving the first file identifier in the file identifier table that includes a plurality of file identifiers for files to be scanned;
identifying a first malware definition, the first malware definition being associated with a first malware program;
comparing the first malware definition with each file identifier in the file identifier table, wherein comparing the first malware definition with each file identifier in the file identifier table comprises scanning all open files on the computing device;
when a result of comparing a selected file identifier from the file identifier table with the first malware definition suggests that the a file associated with the selected file identifier comprises the first malware program, calculating an additional file identifier that represents a second portion of the file associated with the selected file identifier, saving the additional file identifier in the file identifier table, and comparing the additional file identifier with a first malware identifier to make a more definitive determination of whether the file associated with the selected file identifier comprises the first malware program;

when a result of comparing the selected file identifier with the first malware definition indicates that the file associated with the selected file identifier does not comprise the first malware program, making a determination that the file associated with the selected file identifier does not comprise the first malware program instead of calculating the additional file identifier.

11. The computer-implemented method of claim 10, wherein comparing the first malware definition with each file identifier in the file identifier table comprises performing a binary search of the file identifier table for the first malware definition.

12. The computer-implemented method of claim 10, further comprising:
receiving a malware update comprising a second malware definition, the second malware definition being associated with a second malware program;
performing a second scan of the computing device, the second scan comprising:
checking the file identifier table to determine that the first file identifier of a first file is in the file identifier table;
comparing the second malware definition with each file identifier in the file identifier table, wherein comparing the second malware definition with each file identifier in the file identifier table comprises comparing the second malware definition with the first file identifier.

13. The computer-implemented method of claim 12, further comprising:
during the second scan, checking the file identifier table to determine whether a second file identifier of a second file is in the file identifier table;
determining that the second file identifier of the second file is not in the file identifier table;
calculating the second file identifier of the second file and saving the second file identifier of the second file to the file identifier table.

14. The computer-implemented method of claim 10, wherein comparing the first malware definition with each file identifier in the file identifier table comprises performing a linear search of the file identifier table for the first malware definition.

15. The computer-implemented method of claim 10, further comprising:
after the first scan terminates, receiving a second malware definition;
initiating a second scan, and as part of the second scan, determining that the file has been modified since the first file identifier was calculated;
in response to determining that the file has been modified, recalculating the first file identifier.

16. The computer-implemented method of claim 10, wherein the file identifier table is stored in a remote database.

17. The computer-implemented method of claim 1, further comprising:
for each file in the set of files, calculating a plurality of additional file identifiers for the file in addition to the first and second file identifiers;
for each file in the set of files, storing the plurality of additional file identifiers with the first and second file identifiers.

18. The computer-implemented method of claim 1, wherein performing the first scan comprises performing an initial scan of the computing device using malware identifiers that were included with a security software package installed on the computing device.

19. The computer-implemented method of claim 1, wherein the first and second file identifiers are stored in a remote database.

* * * * *